United States Patent
Keeton et al.

(10) Patent No.: US 9,389,913 B2
(45) Date of Patent: Jul. 12, 2016

(54) RESOURCE ASSIGNMENT FOR JOBS IN A SYSTEM HAVING A PROCESSING PIPELINE THAT SATISFIES A DATA FRESHNESS QUERY CONSTRAINT

(75) Inventors: Kimberly Keeton, San Francisco, CA (US); Charles B. Morrey, III, Palo Alto, CA (US); Craig A. Souies, San Francisco, CA (US); Alistair Veitch, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 407 days.

(21) Appl. No.: 13/383,594

(22) PCT Filed: Jul. 8, 2010

(86) PCT No.: PCT/US2010/041307
§ 371 (c)(1),
(2), (4) Date: Jan. 12, 2012

(87) PCT Pub. No.: WO2012/005728
PCT Pub. Date: Jan. 12, 2012

(65) Prior Publication Data
US 2014/0223444 A1    Aug. 7, 2014

(51) Int. Cl.
G06F 9/50    (2006.01)
G06F 17/30    (2006.01)

(52) U.S. Cl.
CPC .............. *G06F 9/50* (2013.01); *G06F 9/5011* (2013.01); *G06F 17/30286* (2013.01)

(58) Field of Classification Search
None
See application file for complete search history.

(56) References Cited

U.S. PATENT DOCUMENTS

| | | | |
|---|---|---|---|
| 3,905,023 A | 9/1975 | Perpiglia | |
| 5,325,525 A | 6/1994 | Shan | |
| 7,634,776 B2* | 12/2009 | Parameswaran et al. | 718/105 |
| 7,991,794 B2* | 8/2011 | Bedi et al. | 707/796 |
| 8,225,319 B2* | 7/2012 | Laithwaite et al. | 718/102 |
| 8,311,982 B2* | 11/2012 | Soules et al. | 707/625 |
| 8,478,952 B1* | 7/2013 | Armorer | 711/162 |
| 2007/0211280 A1 | 9/2007 | Bansal | |

FOREIGN PATENT DOCUMENTS

KR    10-2002-0057834    9/2002

OTHER PUBLICATIONS

Keeton, Kimberly et. al. "Lazybase: Freshness vs. performance in information management" ACM SIGOPS Operating Systems Review, vol. 44 Issue 1, Jan. 2010.*
International Preliminary Report on Patentability, PCT/US2010/041307, HP reference 82259780, Jan. 17, 2013, 5 pps.

(Continued)

*Primary Examiner* — Mengyao Zhe
*Assistant Examiner* — Michael Ayers
(74) *Attorney, Agent, or Firm* — Trop, Pruner & Hu, P.C.

(57) ABSTRACT

A set of jobs to be scheduled is identified (402) in a system including a processing pipeline having plural processing stages that apply corresponding different processing to a data update to allow the data update to be stored. The set of jobs is based on one or both of the data update and a query that is to access data in the system. The set of jobs is scheduled (404) by assigning resources to perform the set of jobs, where assigning the resources is subject to at least one constraint selected from at least one constraint associated with the data update and at least one constraint associated with the query.

18 Claims, 7 Drawing Sheets

(56) References Cited

OTHER PUBLICATIONS

International Search Report/Written Opinion, PCT/US2010/041307, HP reference 82259780, Apr. 28, 2011, 8 pps.

Leinberger, W. et al, "Job Scheduling in the presence of Multiple Resource Requirements", 1999 ACM/IEEE Conf on Supercomputing, IEEE, Nov. 13-18, 1999.

* cited by examiner

RESOURCE ASSIGNMENT FOR JOBS IN A SYSTEM HAVING A PROCESSING PIPELINE THAT SATISFIES A DATA FRESHNESS QUERY CONSTRAINT

CROSS-REFERENCE TO RELATED APPLICATION

This application is a national stage application under 35 U.S.C. §371 of PCT/US2010/41307, filed Jul. 8, 2010.

BACKGROUND

Data mining, analysis and search often make up a substantial portion of enterprise application workloads. Examples of unstructured data that are the subject of data mining, analysis, and search include word processing documents, spreadsheets, presentations, news updates, web pages, email messages, hardware or software monitoring logs, and so forth.

Such data is collected into datasets. However, as the sizes of datasets increase, the ability to efficiently search the content of such datasets has become more challenging.

BRIEF DESCRIPTION OF THE DRAWINGS

Some embodiments are described with respect to the following figures.

DETAILED DESCRIPTION

Figure 1:
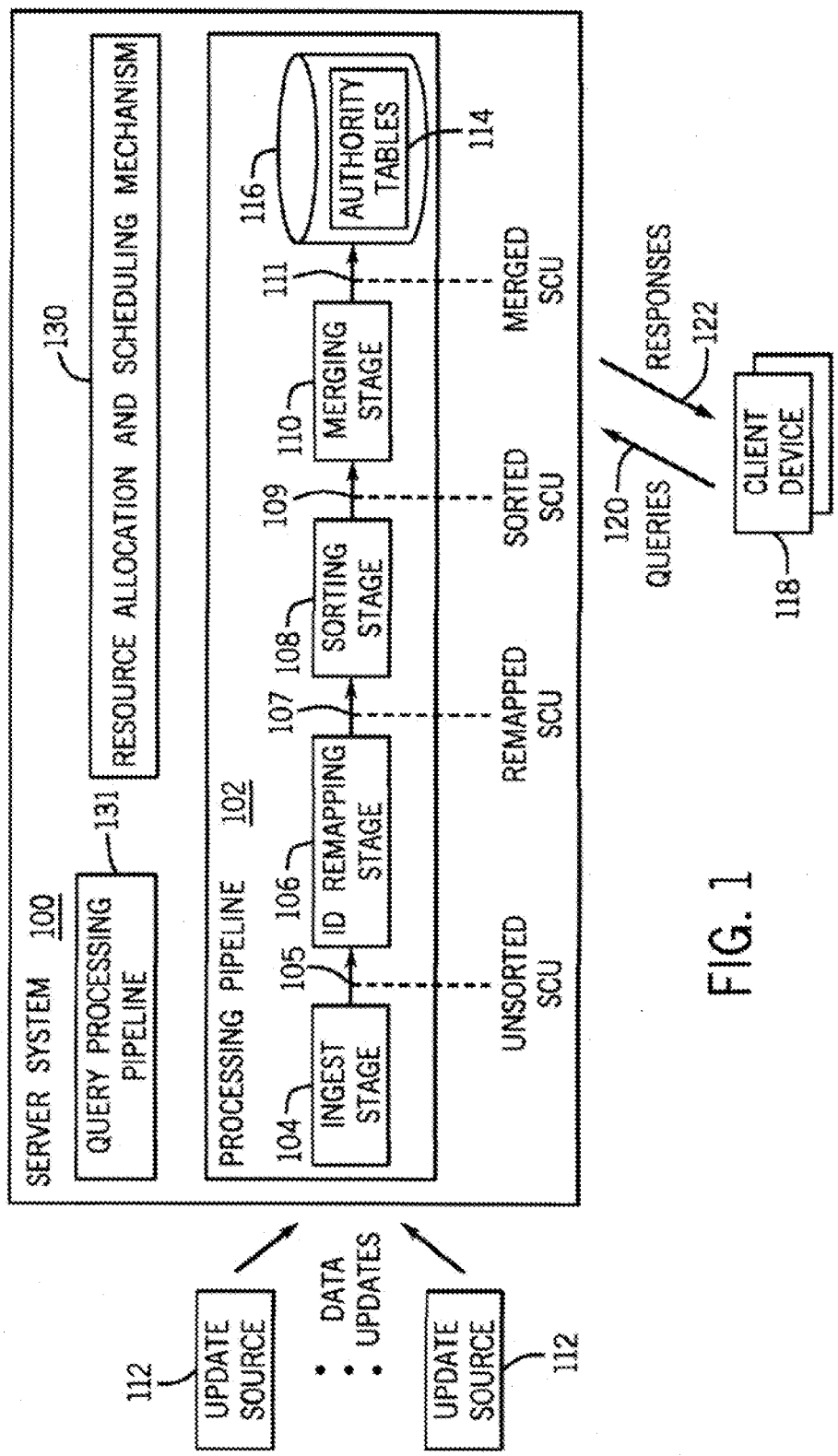
FIG. 1 is a block diagram of a system having a processing pipeline according to some embodiments.

An organization can have a relatively large amount of data that users or applications within the organization may request for purposes of data mining, analysis, search, and so forth. The data can span many different departments or divisions within the organization, and can be stored on various different types of devices, including desktop computers, notebook computers, email servers, web servers, file servers, and so forth. Examples of requests for data include electronic discovery requests, document requests by employees, requests made for information technology (IT) management operations, or other types of requests.

To improve the ability to locate the content of various data stored across an organization, metadata associated with such data from many information sources can be uploaded to a server system (or multiple server systems) to allow users to submit queries against the server system(s) to locate data based on the metadata. Examples of metadata that can be uploaded to the server system(s) include metadata computed based on content of the data, including hashes (produced by applying hash functions on data), term vectors (containing terms in the data), fingerprints, feature vectors. Other examples of metadata include file system metadata, such as file owners or creators, file size and security attributes, or information associated with usage of the data, such as access frequency statistics.

In the ensuing discussion, reference is made to one server system for storing metadata (or other types of data). In alternative implementations, it is noted that there can be multiple server systems. Although reference is made to storing metadata in the server system, it is noted that embodiments can also be applied for implementations in which other types of data are stored in the server system. As used here, the term "data" can refer to any type of data, including actual data, metadata, or other types of information.

In a large organization, the server system is designed to support data updates from multiple sources across the organization (e.g., up to hundreds of thousands or even millions for a large organization). A "data update" refers to a creation of data, modification of data, and/or deletion of data. Because there can be a relatively large number of data updates to upload to the server system, it may take a relatively long period of time before the data updates are available for access by queries submitted to the server system using conventional techniques.

Different applications have different data freshness specifications (goals associated with data freshness) and different query performance goals. "Data freshness" refers to how up-to-date results should be for a response to a query. In some applications, a user may want a relatively quick response to a query, but the user may be willing to accept results that are out-of-date (e.g., out-of-date by a certain time period, such as 12 hours, one day, etc.). On the other hand, a virus scanning application may want an up-to-date response about content of various machines within the organization, but the virus scanning application may be willing to accept a slower response time to a query.

In accordance with some implementations, client devices that are able to submit queries to the server system are able to specify their corresponding data freshness constraints and query performance goals (and/or other query constraints). As used here, a "query constraint" refers to a condition that is to be satisfied for a query. Based on the specified data freshness constraints and query performance goals (typically query response times or query throughputs below a response time threshold) or other query constraints, the server system processes a query accordingly. If data freshness is indicated to be important to a client device, then the server system will respond to a query from the client device by providing response data that is more up-to-date. However, this may come at the expense of a longer query processing time. On the other hand, if the client device specifies a lower level of data freshness but a higher query performance goal (e.g., faster query response time), then the server system will process a query by providing response data that may not be up-to-date (the response data may be up-to-date to within one day of the present time, for example), but the response data will be provided to the requesting client device in a shorter amount of time.

In some implementations, the server system has a processing pipeline having plural processing stages to apply corresponding different processing to data updates to allow the data updates to be stored in the server system. The processing pipeline of the server system has multiple processing stages to perform different types of processing with respect to incoming data (data updates) that is to be stored in the server system.

When processing a query, results for the query can be obtained from database tables as well as from the stage(s) of the processing pipeline.

In accordance with some embodiments, a set of jobs is identified to be scheduled based on any data update(s) that is (are) being processed in the processing pipeline of the server system and any query(ies) received by the server system. A "job" refers to a task of using a certain set of allocated resources to complete a fixed amount of work. The set of jobs is then scheduled by the server system by assigning available resources in the server system to perform the set of jobs, where assignment of the available resources is based on using a scheduling optimization technique that is subject to the various constraints, including query constraints and update ingestion constraints. Query constraints are associated with any received queries, whereas the update ingestion constraints are associated with processing to be performed by the processing pipeline of the server system. The query constraints and update ingestion constraints are discussed further below. If there are no pending queries to be executed, then the set of jobs to be scheduled would be based on just the data updates to be processed by the processing pipeline, and scheduling would be based on just the update ingestion constraints, which are associated with the data updates to be processed by the processing pipeline.

A general representation of a server system 100 that includes a processing pipeline according to some implementations is depicted in FIG. 1. As depicted, the server system 100 includes a processing pipeline 102 that has an ingest stage 104, an ID (identifier) remapping stage 106, a sorting stage 108, and a merging stage 110. Data updates from various update sources 112 are provided to the server system 100 for processing by the processing pipeline 102. Examples of the update sources 112 include various machines that can store data within an organization, where the machines can include desktop computers, notebook computers, personal digital assistants (PDAs), various types of servers (e.g., file servers, email servers, etc.), or other types of devices. Other examples of update sources 112 include sources of stock market transactions, web logs, cluster logs, e-commerce history, and so forth. Although specific stages of the processing pipeline 102 are depicted in FIG. 1, it is noted that in different implementations alternative stages or additional stages can be provided in the processing pipeline 102.

A data update that is sent to the server system 100 can include the metadata associated with the data stored on the update sources 112, as discussed above. Alternatively, instead of metadata, actual data can be stored in the server system 100, such as various types of files, emails, video objects, audio objects, and so forth.

As further depicted in FIG. 1, client devices 118 can submit queries 120 to the server system 100. A query processing pipeline 131 in the server system 100 responds to the queries 120 with responses 122 that are provided back to the client devices 118. Note that the client devices 118 may or may not have members in common with the update sources 112.

The processing pipeline 102 provides the ability to trade query result freshness for query performance in the presence of ongoing data updates. The processing pipeline 102 achieves these goals through the use of a pipelined architecture that transforms the data updates to make them more efficient to query, at the cost of decreased freshness. Queries requested by the client devices selectively access different ones of these stages depending upon the result freshness desired by the client; thus the processing pipeline 102 is able to trade some query performance for increased query result freshness, or vice versa.

In some implementations, updates from the update source(s) 112 are applied to an "authority table" 114 stored in a data store 116 of the server system 100. An authority table 114 refers to a repository of the data that is to be stored by the server system 100, where the authority table 114 is usually the table that is searched in response to a query for data. The data store 116 can store multiple authority tables 114, in some implementations. More generally, the authority tables 114 are referred to as data tables, which are contained in a database. A "database" refers to a collection of data, tables.

Another type of table that can be maintained, by the server system 100 is an update table, which contains additions, modifications, and/or deletions that are to be applied to an authority table 114 after processing through the processing pipeline 102. An update table has the same schema as the associated authority table, as well as additional columns to indicate the type of operation and a timestamp. The various processing stages (104, 106, 108, 110) are configured to process update tables.

The ingestion of updates by the server system 100 should leave the server system 100 in a consistent state, which means that all of the underlying tables affected by the updates will be consistent with one another.

Multiple updates can be batched into a single self-consistent update (SCU) (more generally referred to as a "batch of updates"). The SCU is applied to tables stored in the server system 100 as a single atomic unit, and is not considered durable until all the individual updates in the batch (SCU) are written to stable (persistent) storage. Atomic application of data updates of an SCU to the stable storage means that all data updates of the SCU are applied or none are applied. Data updates in any one SCU are isolated from data updates in another SCU.

The ingest stage 104 of the processing pipeline 102 batches (collects) incoming updates from update sources 112 into one or plural unsorted SCUs (or other types of data structures). In some implementations, an unsorted SCU is durable, which means that the updates of the SCU are not lost upon some error condition or power failure of the server system 100.

As shown in FIG. 1, the output (105) of the ingest stage 104 is an unsorted SCU (or multiple unsorted SCUs). Each SCU includes one or plural update tables containing update data. The unsorted SCU(s) are provided to the ID remapping stage 106, which transforms initial (temporary) ID(s) of SCU(s) into global ID(s). Effectively, the ID remapping stage 106 maps an ID in a first space to an ID in a second space, which in some implementations is a global space to provide a single, searchable ID space. The initial (temporary) IDs used by the ingest stage 104 are assigned to each unique entity (for example, file names) as those entities are processed. ID's are used in place of relatively large pieces of incoming data such as file path names, which improves query and processing times and reduces usage of storage space. In addition, in implementations where the ingest stage 104 is implemented with multiple processors, temporary IDs generated by each of the processors can be remapped to the global ID space. In this way, the processors of the ingest stage 104 do not have to coordinate with each other to ensure generation of unique IDs, such that greater parallelism can be achieved.

The output (107) of the ID remapping stage 106 includes one or plural remapped SCUs (within each remapped SCU, an initial ID has been remapped to a global ID). The remapped SCU is provided to the sorting stage 108, which sorts one or plural update tables in the remapped SCU by one or plural keys to create a sorted SCU that contains one or plural searchable indexes.

The output (109) of the sorting stage 108 is a sorted SCU (or multiple sorted SCUs), which is (are) provided to the merging stage 110. The merging stage 110 combines individual sorted SCUs into a single set of authority tables 114 to further improve query performance. The output of the merging stage 110 is represented as 111.

In accordance with some implementations, the various processing stages 104, 106, 108, and 110 of the processing pipeline 102 are individually and independently scalable. Each stage of the processing pipeline 102 can be implemented with a corresponding set of one or plural processors, where a "processor" can refer to an individual central processing unit (CPU) or to a computer node. Parallelism in each stage can be enhanced by providing more processors. Assignment of the amount of parallelism to each stage is based on a scheduling optimization problem discussed further below. In this manner, the performance of each of the stages can be independently tuned by implementing each of the stages with corresponding infrastructure (e.g., a corresponding set of processors). Note that in addition to implementing parallelism in each stage, each stage can also implement pipelining to perform corresponding processing operations. In other words, in addition to subdividing incoming data for processing across multiple processors in a given stage to achieve parallelism, the given stage can also subdivide the work involved for the stage into a sequence of operations and have different processors perform each of the operations in the sequence (to provide pipelining).

To process a query from a client device 118, the server system 100 can access just the authority tables 114, or alternatively, the server system 100 is able to selectively access one or multiple ones of the processing stages 104, 106, 108, and 110 in the processing pipeline 102. The work involved in processing a query is optimal (smallest) when just the authority tables 114 have to be consulted to process a query. However, accessing just the authority tables 114 means that the response data retrieved may not be up-to-date (since there may be various data updates in the different stages of the processing pipeline 102).

To obtain fresher (more up-to-date) data, the stages of the processing pipeline 102 can be accessed. However, having to access any of the processing stages in the processing pipeline 102 would increase the amount of work involved to process the query, with the amount of work increasing depending upon which of the processing stages are to be accessed. Accessing a later stage of the processing pipeline 102 involves less query processing work than accessing an earlier stage of the processing pipeline 102. For example, accessing content of sorted and merged update tables provided by the sorting and merging stages 108 and 110 involves less work than accessing the unsorted update tables maintained by the ingest stage 104 or the ID remapping stage 106. Moreover, accessing the ingest stage 104 may involve the additional operation of mapping a global ID to an initial ID that is kept by the ingest stage 104.

Whether or not to access the processing stages of the processing pipeline 102 for processing a query depends upon query constraint(s), such as specifications of a data freshness constraint and query performance goal (query response time) set by a client device 118. Increased data freshness means that the server system 100 should access earlier stages of the processing pipeline 102. A higher performance goal means that the server system 100 should avoid accessing earlier stages of the processing pipeline 102 to retrieve response data for a query. A higher performance goal also means that transformation and consolidation (e.g., ID remapping, sorting, and merging) have to be done to ingest the data updates before the data updates are queried.

For example, in one scenario, data updates may be sorted, but not merged, which means that queries would have to consult the authority tables, plus multiple sorted update tables, which may result in lower query performance. In another scenario, all update tables may have already been merged with authority tables, such that query performance can be improved. In this latter scenario, increased effort is provided up front (to process the data updates in the processing pipeline) to make query processing more efficient.

As further shown in FIG. 1, the server system 100 includes a resource allocation and scheduling mechanism 130, which schedules a set of jobs associated with data updates and any received query for data, by assigning available resources in the server system 100 to perform the set of jobs. In other implementations, the resource allocation and scheduling mechanism 130 can be part of a computer system separate from the server system 100. As noted, the assigning of the available resources by the resource allocation and scheduling mechanism 130 includes using a scheduling optimization technique that is subject to various constraints, including update ingestion constraints and query constraints. The resource allocation and scheduling mechanism 130 is described further below. As noted above, a "job" refers to a task of using a certain set of allocated resources to complete a fixed amount of work. Examples of jobs include at least one task selected from among: tasks performed by the processing pipeline stages (e.g., ingestion, ID remapping, sorting, merging, etc.), reading of input data at a given processing pipeline stage from a previous processing pipeline stage, and/or processing data (including authority tables and/or update tables) to satisfy a query.

Figure 2:
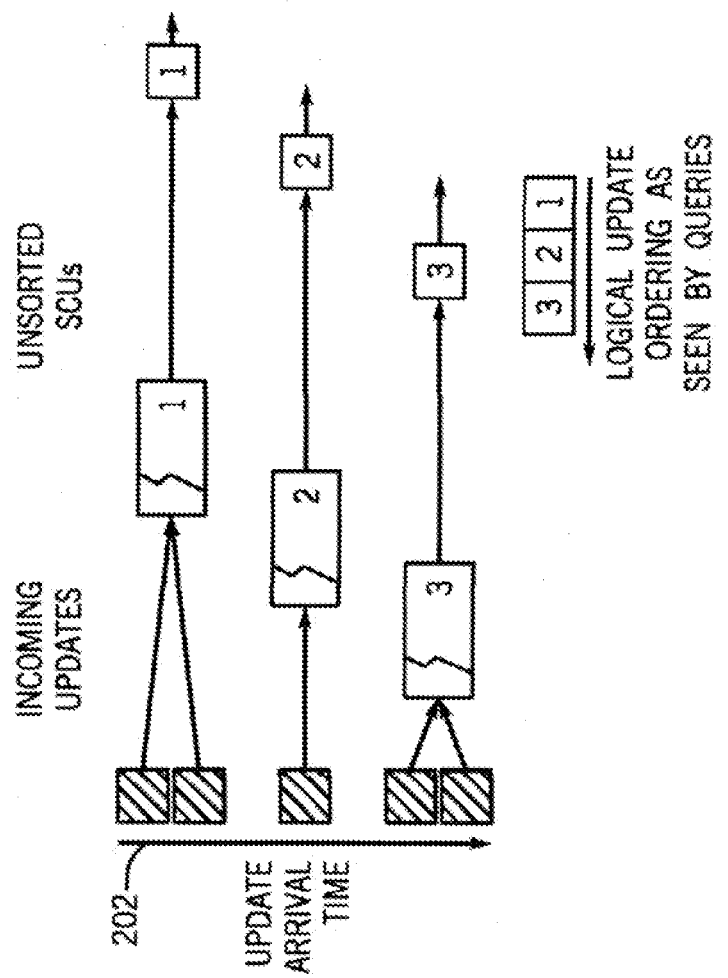
FIG. 2 is a schematic diagram illustrating processing of data updates received over time, in accordance with some embodiments.

FIG. 2 shows an example of the arrival of updates over time (represented by downwardly pointing arrow 202) from one or plural update sources 112. The data updates can be described as a time series of data updates. The data update workload may vary over time, with the number of outstanding queries and mix of query types being variable. The updates are represented by the shaded boxes on the left side of FIG. 2. The lower boxes represent updates that have arrived later in time than the upper boxes in FIG. 2.

The updates are combined to form an SCU. Updates are collected together until either a sufficient amount of time has passed (based on a timeout threshold) or a sufficient amount of data has been collected (based on some predefined size watermark). After either the timeout has occurred or the size watermark has been reached, new updates that are received are directed to the next SCU. Three unsorted SCUs are depicted in FIG. 2, with the unsorted SCUs labeled "1", "2", and "3". FIG. 2 also illustrates the logical update ordering of the unsorted SCUs 1, 2, and 3 as seen by queries. As shown in FIG. 2, SCUs are created in client arrival order, and exposed to queries in this order, although some implementations may prefer to process and expose SCU's in other orders. Freshness constraints can be satisfied by examining the SCUs that correspond to the desired point in time. Identifying SCUs for satisfying freshness constraints involves understanding the time to generate the SCU, the time to complete its processing throughout each stage of the processing pipeline 102 (pipeline processing latency), and the time, to execute the query.

The first component (time to generate the SCU) depends on the arrival patterns of client updates, as well as the watermarks and timeout specifications used to accumulate the SCU. Pipeline processing latency can be determined as a function of the steady-state throughput of each stage.

Depending on when a query is issued and what its freshness specifications are, the system can choose the appropriate representation of the SCU (sorted or unsorted) to consult in satisfying the query. The use of SCUs also permits isolation between updates within a pipeline stage, and between queries and update ingestion. The unit of isolation is the SCU, which may contain updates from multiple data sources 112. If the goal is to achieve per data source isolation, then SCUs can be formed with updates from a single data source only.

As noted above, the SCUs are applied in a time order. For example, each SCU can be associated with a timestamp indicating when the SCU was created. The timestamps of the SCUs can be employed to specify the order of applying the SCUs in the processing pipeline 102. In other implementations, other mechanisms for ordering the SCUs can be used. Ordering SCUs is easy in implementations where the ingest stage is implemented with just one processor (e.g., one computer node), such that the SCUs are serially applied. However, if the ingest stage 104 is implemented with multiple processors (e.g., multiple computer nodes), then ordering of SCUs becomes more complex. In provisioning the ingest stage, if enhanced parallelism is desired, then a more complex mechanism would have to be provided to assure proper ordering of the SCUs. On the other hand, reduced parallelism would involve less complex ordering mechanisms, but would result in an ingest stage having reduced performance.

Figure 3:
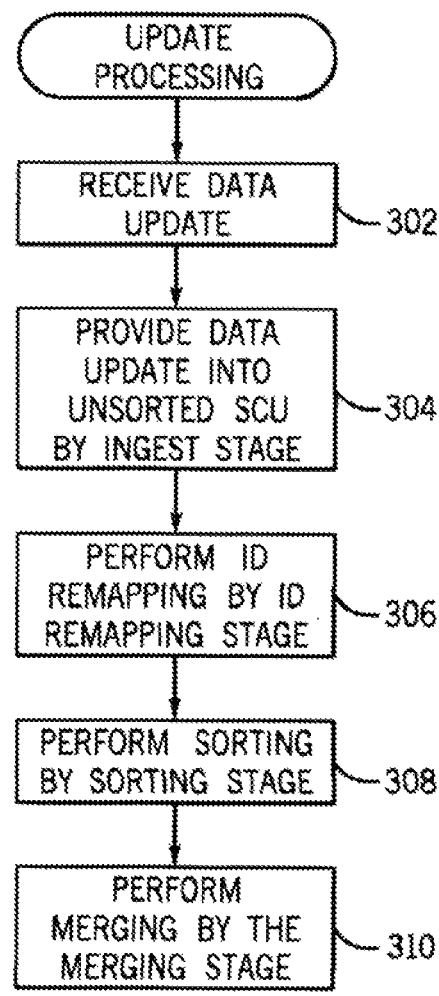
FIG. 3 is a flow diagram of a process of performing data update processing, in accordance with some embodiments.

FIG. 3 illustrates update processing performed by the processing pipeline 102 in accordance with some implementations. A data update is received (at 302) by the processing pipeline 102 (FIG. 1). The data update is provided (at 304) into an unsorted SCU by the ingest stage 104.

A goal of the ingest stage 104 according to some implementations is to get data from client devices into a form so that the data is both (1) durable and (2) available for query, albeit with potentially high query cost. In the ingest stage 104, updates are read from client devices and written as rows into the corresponding update table kept by the ingest stage 104. ID keys in the updates are assigned initial IDs and the mapping from key to temporary ID is stored with the unsorted data. The combination of unsorted data and initial ID mappings results in an unsorted SCU that can be passed to the next stage (ID-remapping stage 106) of the pipeline 102.

Upon receiving the unsorted SCU from the ingest stage 104, the ID remapping stage 106 performs (at 306) ID remapping by converting initial IDs to global IDs. To convert SCUs from using initial IDs to global IDs, a two-phase operation can be performed: ID-assignment and update-rewrite, which can be both pipelined and parallelized. In ID-assignment, the ID remapping stage 106 does a lookup on the keys in the SCU to identify existing keys and then assigns new global IDs to any unknown keys, generating an initial ID to global ID mapping for this update. A benefit of first checking for existing keys before assigning global IDs is that the relatively small size of the update dictates the size of the lookup, which enhances the likelihood of data processed by the ingest stage 104 can fit into physical memory. Thus, the lookup does not grow with the size of the system 100 and, over time, will not dominate the ingest time. Because the ID-assignment phase does a lookup on a global key-space, this phase can be parallelized through the use of key-space partitioning.

The second phase, update-rewrite, involves rewriting the SCU with the correct global IDs. Because the mapping from initial ID to global ID is unique to the SCU being converted, any number of rewrites can be performed in parallel.

Next, sorting of the remapped SCU is performed (at 308) by the sorting stage 108. The SCU's unsorted update tables are sorted by the appropriate key or keys. Sorting is performed by reading the update table data to be sorted into memory and then looping through each view for that update table, sorting the data by the view's key. The resulting sorted data sets form the sorted SCU. The sorting stage 108 can be parallelized to nearly any degree. Because sorted data is merged in the next stage, sorting can take even a single table, break it into multiple chunks, and sort each chunk in parallel, resulting in multiple sorted output files.

Next, merging is performed (at 310) by the merging stage 110. A sorted SCU can be merged by the merging stage 110 into an authority table 114. Because the performance of queries against sorted data is dictated primarily by the number of sorted update tables to search through, merging update tables together into fewer tables improves the query performance. Even merging two sorted update tables into a single sorted update table will improve query performance. In some implementations, tree-based parallelism is implemented in the merging stage 110. Rather than each sorted table being directly merged with the corresponding authority table, sets of update tables can be first merged together, and non-overlapping sets can be merged in parallel, forming a tree of updates working toward the "root," which merges large sorted update tables with the authority table. The merge with the authority table, like ID-assignment, is a global operation, and can be parallelized through the use of key-space partitioning, in which the authority table is maintained as several table portions partitioned by key-space, allowing merges of separate key spaces to proceed in parallel. Finally, merges to each of the individual authority views can also be executed in parallel.

In some implementations, merging an update table into an authority table can be accomplished by performing a merge-join, in which the entire authority table is updated. However, if the authority table is large, then this operation can be relatively expensive, since potentially the entire authority table may have to be updated. A benefit of performing a merge using this technique is that the data in the authority table remains stored in sequential order on the underlying storage medium.

In alternative implementations, an authority table can be divided into multiple extents, where each extent has a set of rows of data. To merge an update table into the authority table, the merging stage 110 first identifies the extents (usually some subset less than all of the extents of the authority table) that will be affected by the merge. The merge would then only rewrite the identified extents (thus the cost of the merge operation is based on the size of the update table and the distribution of keys in both the update table and the authority table, rather than the size of the authority table). The new extents (containing the merged old data and new data) can be added to the end of the authority table, for example. An index to the authority table can be updated to point to the new extents.

An issue of using the latter merge technique is that the extents in the authority table may no longer be in sequential order on the underlying storage medium. However, random access to the authority table does not suffer since an index can be used to quickly access the content of the authority table. Sequential access performance may potentially suffer, since if the authority table is stored on disk-based storage media, disk seeks may be involved in accessing logically consecutive data. To address this issue, an authority table rewrite can be performed to place the extents of the authority table in sequential order. The rewrite can be performed in the background, such as by another stage in the processing pipeline 102.

With respect to total system scalability, each of the processing stages of the processing pipeline 102 exhibit different scaling properties as described above. Ingest, sorting, and the update-rewrite phase of ID remapping are all linearly parallelizable with the number of processors used to implement the corresponding stage. Merging is log n parallelizable, where n is the fan-out of the merge tree. Finally, the ID-assignment phase of ID remapping and merging are both m-way parallelizable, where m is the number of partitions created in the key-space. The authority table merge is t-way parallelizable with t being the number of distinct views. The authority table merge is also m-way parallelizable.

A goal of the resource allocation and scheduling mechanism 130 (FIG. 1) in accordance with some implementations is to determine how to allocate resources for processing in the processing pipeline (if applicable) and for query processing (if any), so that various constraints can be satisfied, and processing in the processing pipeline can keep up with client data updates. This problem is formulated as a scheduling optimization problem, where the objective is to minimize penalties for violating applicable constraints including at least one of the following constraints: data ingestion constraints and query constraints.

Query constraints can include input data specifications, including freshness constraints to indicate which data updates should be included in a result; an input data constraint relating to reading, input data from one or more different computer nodes; response time constraints specifying target response times; precedence constraints to specify an order in which updates are exposed to queries; execution time constraints to indicate time estimates provided by a query execution time model; and resource constraints to specify that the sum of all jobs, including query jobs and data update jobs, on a resource should not exceed the resource's capacity. (Note that resource constraints are not specific to query processing.)

Update ingestion constraints can include input data specifications, which can specify that input data for a given processing pipeline stage is to be read from other nodes if an adjacent processing pipeline stage is not on the same nodes; a precedence constraint to specify precedence of processing pipeline (e.g., ID remapping occurs before sorting, which occurs before merging); execution time constraints to specify time estimates provided by an update processing stage model; and the resource constraints noted above. A precedence constraint for the processing pipeline specifies an order of update processing that depends on the ordering of the different processing pipeline stages, and/or collection of data updates into an SCU, and/or time of arrival of an SCU. For example, ingesting of the given data update has to occur before ID remapping. ID remapping occurs before sorting, and sorting occurs before merging. Additionally, the precedence constraint can also specify all data updates collected into an SCU are applied together, and that SCUs are processed in time arrival order.

The scheduling optimization problem can be solved using a scheduling optimization technique, such as a technique based on math programming, a technique based on metaheuristics (e.g., genetic algorithms), or a technique based on domain-specific heuristics.

Figure 4:
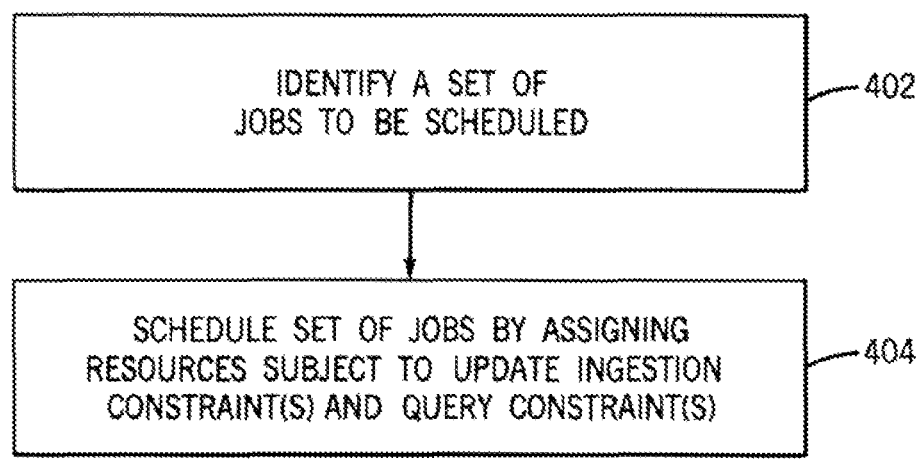
FIG. 4 is a flow diagram of a process of resource assignment and scheduling for jobs, according to some embodiments.

FIG. 4 is a flow diagram of a general process of performing resource allocation and scheduling of jobs. The process of FIG. 4 can be performed by the resource allocation and scheduling mechanism 130.

A set of jobs to be scheduled is identified (at 402) by the resource allocation and scheduling mechanism 130. The set of jobs is based on one or both of data update(s) to be performed by the processing pipeline, and any received query or queries that are to access data in the server system. The set of jobs is then scheduled (at 404), using the scheduling optimization technique discussed above, by the resource allocation and scheduling mechanism 130, which involves first assigning the available resources subject to constraints selected from among the update ingestion constraints and query constraints discussed above. The jobs are then scheduled for execution using the assigned resources.

Figure 5:
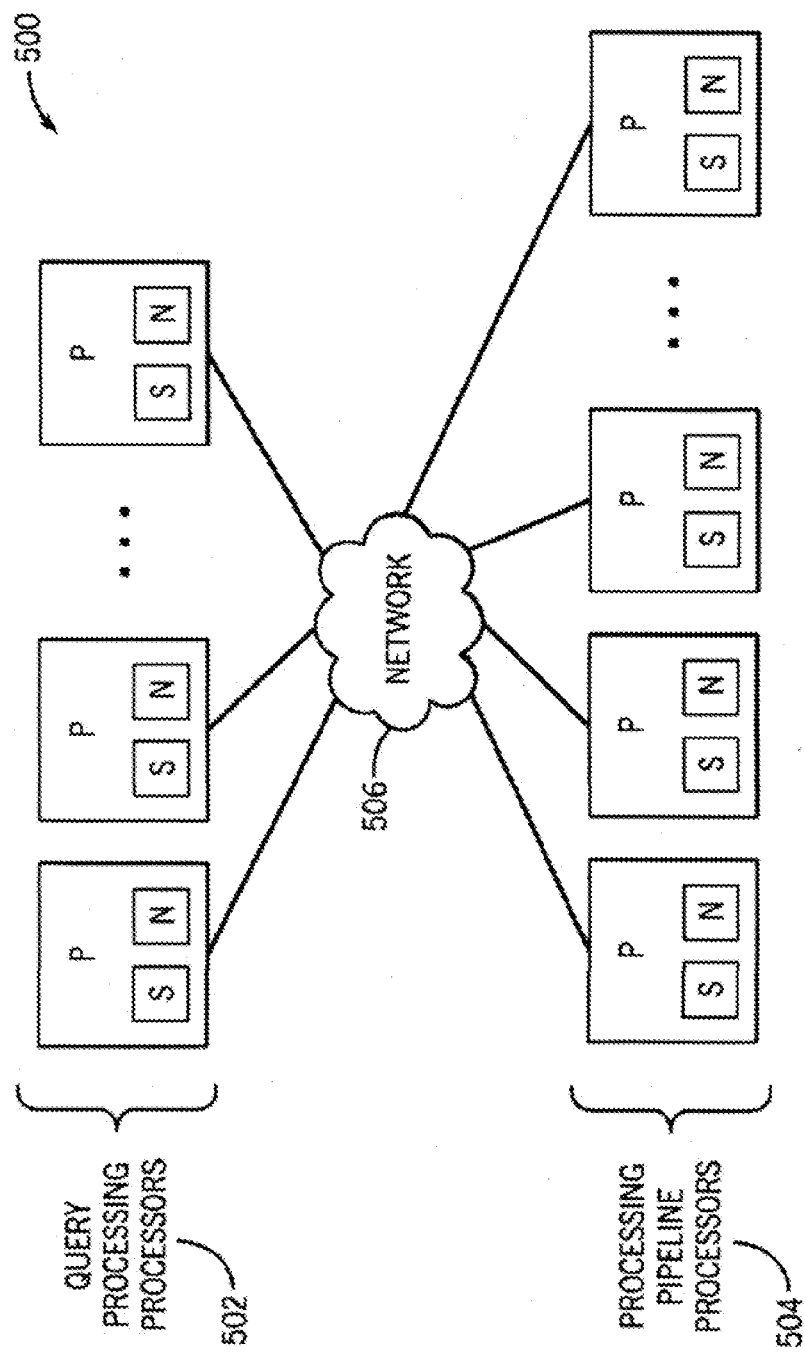
FIG. 5 is a schematic diagram of processors and other resources assignable to various tasks according to some embodiments.

FIG. 5 shows an example server system that includes a cluster 500 of processors (each processor is labeled "P" in FIG. 5), where each "processor" can be a CPU or a computer node, as noted above. The cluster 500 of processors includes a first pool of query processing engine processors 502 and a second pool of processing pipeline processors 504. Although the example of FIG. 5 divides the cluster 500 of processors into two different pools (502 and 504) that are dedicated for performing query processing and pipeline processing, respectively, it is noted that in different implementations, the cluster 500 of processors can all be part of one pool that can be selectively allocated to any one of query processing or pipeline processing tasks.

Within the cluster 500, the processors are connected by a network 506. In some implementations, the processors can be organized using a shared nothing model, which means that if processors that share data (e.g., adjacent processing pipeline stages or queries accessing the output of a processing pipeline stage) are scheduled on two different processors, data has to be explicitly copied between the two processors. Each processor P is associated with storage media (labeled "S") and a network interface (labeled "N"). In the example of FIG. 5, each processor P is depicted with storage media S and network interface N within the processor P. In such examples, the processor would be considered a computer node that contains the storage media S and network interface N. In different examples in which the processor P is a CPU, the storage media S and network interface N would be external but connected (directly or indirectly) to the processor P.

Examples of the storage media S include an integrated circuit memory device, a disk-based storage device, and/or any other type of storage device. A network interface N is used to communicate over the network 506. The network interface N can include a hardware communications chip and a network protocol stack.

In some implementations in which the processing pipeline processors 504 are computer nodes, authority tables can be stored on a first set of nodes, while update tables (updated by the stages of the processing pipeline 102) are stored on a second, separate set of nodes. For example, sorted update tables are stored on the nodes used to run the sorting stage 108, and merged update tables are stored on the nodes used to run the merging stage 110. Queries that access only the authority tables are processed by accessing just the first set of nodes storing the authority tables. This first set of nodes would also be the nodes on which query processing is performed.

However, if queries cause access of update tables, the corresponding update tables would have to be sent to the authority table nodes (either proactively at ingestion time or reactively/lazily at query time), and query processing that accesses the update tables can be performed on the authority table nodes. Alternatively, the query processing can be distributed across the authority table nodes and update table nodes. This latter approach would involve joining together the final results, since updates may add, delete, or modify rows of the underlying authority tables.

A benefit of storing update tables at update table nodes and sending them to the authority table nodes at query time is that update table transfer between nodes is performed only if they are accessed. In addition, just the portions of the update tables that are accessed have to be transferred between nodes, which can reduce network bandwidth consumption.

Processors from the cluster 500 are allocated to perform jobs that are pending in the server system. A set of jobs to be scheduled is defined by a collection of data updates to be processed by the processing pipeline 102, and queries that have been received by the server system to access data stored by the server system, including data in the authority tables and update tables.

Each query may be associated with an arrival time (time of arrival at the server system), a type of the query, the selectivity of the query, a data freshness constraint, a query performance goal, and a penalty rate for violating the query constraints (e.g., such as in the form of dollars per second over the target query response time). The type of query determines which underlying authority table(s) is to be used to satisfy the query. Each query can be scheduled independently of other queries, or alternatively, multi-query optimization can be performed to simultaneously determine how to schedule multiple queries that may access overlapping data sets.

In allocating processors to a job, it is noted that the entirety of the processor or some fraction of the processor (such as one of plural processor cores in the processor, the network interface N, or some other processor portion) can be allocated to the job. It is also possible to allocate fractions of multiple processors to the job.

Figure 6:
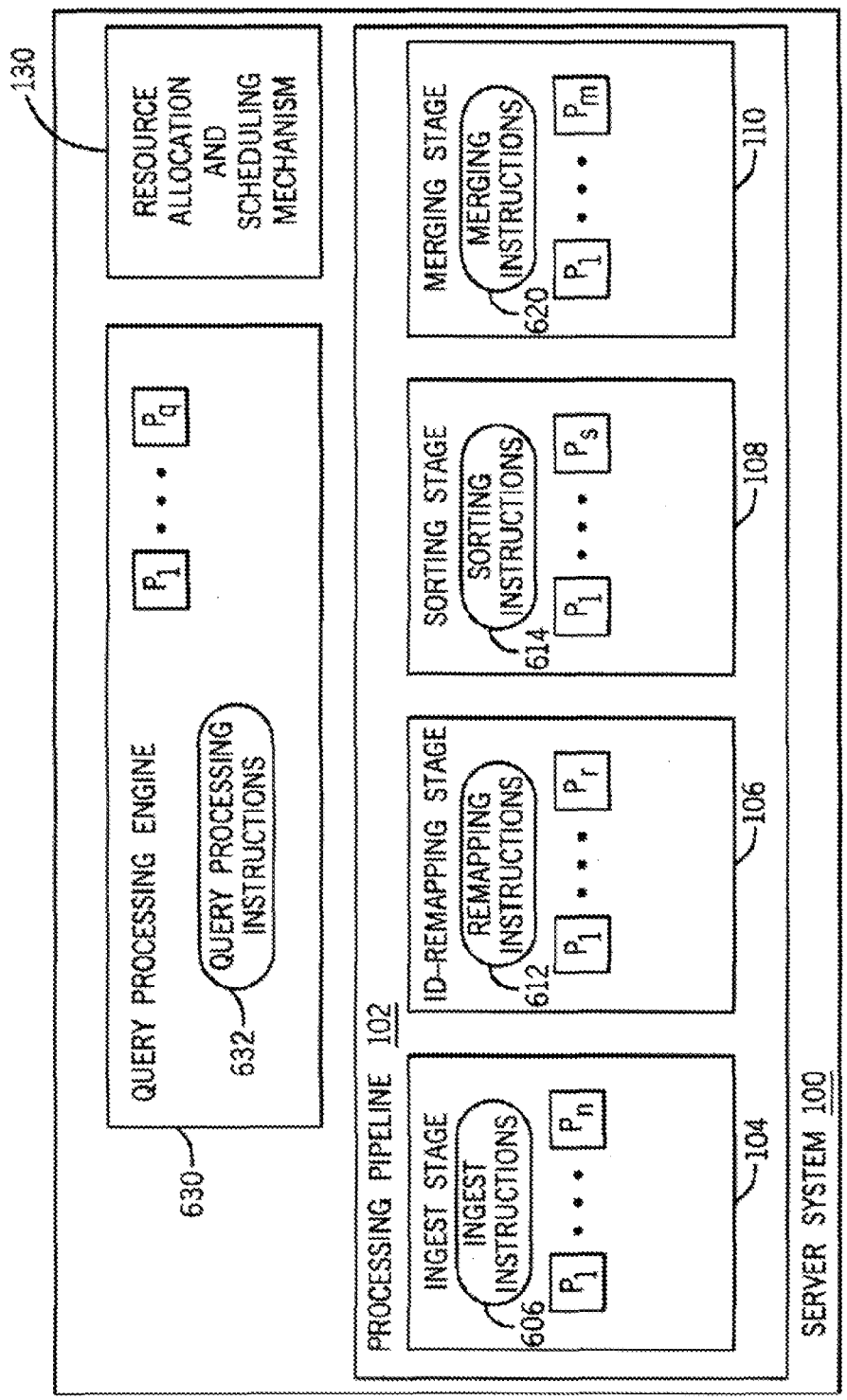
FIG. 6 is a block diagram of a server system having various stages that have been allocated resources according to some embodiments.

FIG. 6 depicts an example allocation of processors to various tasks in the server system 100 for performing a given set of jobs, in accordance with some implementations. In FIG. 6, it is assumed that entire processors are assigned to any given task—alternatively, just fractions of processors can be assigned to a given task. The ingest stage 104 is allocated processors $P_1$ to $P_n$, where n represents the number (one or greater) of processors in the ingest stage 104. The ingest stage 104 includes ingest machine-readable instructions 606 (which can be in the form of multiple threads or processes) executable on the processors $P_1$ to $P_n$. Note that although $P_1$ is used to label a processor in each of the various stages in FIG. 6, $P_1$ does not necessarily refer to the same processor, but instead the $P_1$'s in the various stages are different processors, according to some examples.

The ID remapping stage 106 is allocated processors $P_1$ to $P_r$, where r represents the number (one or greater of processors used in the ID-remapping stage 106. ID remapping machine-readable instructions 612 are executable on the processors $P_1$ to $P_r$.

The sorting stage 108 is allocated processors $P_1$ to $P_s$ (where s is one or greater). Sorting machine-readable instructions 614 are executable on the processors $P_1$ to $P_s$.

The merging stage 110 is allocated processors $P_1$ to $P_m$ (where m is one or greater). Merging machine-readable instructions 620 are executable on the processors $P_1$ to $P_m$. Note that set $P_1$ to $P_m$, set $P_1$ to $P_s$, set $P_1$ to $P_r$, and set $P_1$ to $P_n$ can have some members in common (in other words, certain common processors can be shared among the sets), or the sets can be allocated distinct collections of processors.

The server system also includes a query processing engine 630 to process queries received from client devices 118 (FIG. 1). The query processing engine 630 includes query processing machine-readable instructions 632 executable on one or plural processors $P_1$ to $P_q$ (q being one or greater) allocated to the query processing engine 630 to perform query processing.

In some implementations, the one or plural processors $P_1$ to $P_q$ are allocated from the pool of query processing processors 502 (FIG. 5), while the processors of the processing pipeline stages 104-110 are allocated from the pool of processing pipeline processors 504 (FIG. 5). In alternative implementations, the processors allocated to the query processing engine 530 and the processing pipeline stages 104, 106, 108, and 110 can all be from a common pool.

As noted above, the number of processors allocated to each of the processing stages 104, 106, 108, and 110 is individually and independently scalable. In other words, the numbers n, r, s, m, and q can be independently chosen to tune the respective performance of the corresponding stages and the query processing engine 630, and to meet constraints as determined by the scheduling optimization technique.

In some implementations, non-preemptive scheduling is used once a job is scheduled, meaning that the job continues to execute until completion. For processing pipeline jobs, this means that the processing pipeline stage's parallelism level is fixed for a given batch (SCU). In alternative implementations, preemptive scheduling can be used, where the resources allocated to a job (either the set of resources or the fraction of the allocated resources) may change over the duration of the job. This may be useful in an environment where jobs run in virtualized environments, where it is possible to dynamically change the resources allocated to a virtual environment. A virtual environment refers to an environment in a system in which hardware resources are virtualized for software executing in the system, such as a virtual machine.

As noted above, an objective (expressed as an objective function) of the scheduling optimization problem according to some implementations is to minimize the penalties due to violations of predefined criteria, such as query response times or criteria relating to data updates. Minimizing the penalties due to violations of the predefined criteria are subject to query constraints and/or update ingestion constraints, as noted above.

In some implementations, result freshness can be treated as a hard constraint, rather than a soft constraint, because the result freshness constraint determines which data updates should be included in the query result, and hence determines how much work is to be done to satisfy the query. Once the work to be performed is determined, a resource allocation and job schedule can be determined.

Alternatively, both query response time and data freshness constraints are treated as soft constraints, with penalties for violating each. Since different achieved freshness levels imply different amounts of work to be performed to satisfy the query, for increased efficiency this approach can identify a handful of candidate freshness levels (e.g., authority tables only versus authority tables plus some percentage of the available sorted update tables) to evaluate.

In yet other implementations, update ingestion constraints can also be treated as hard or soft constraints.

To calculate the objective function of the scheduling optimization problem, several decisions are made, as discussed below. These decisions are in the form of assigning values to respective decision variables.

For each data update, the scheduling optimization technique determines which resources are used for the job corresponding to each processing pipeline stage, including the degree of parallelism, which specific processors or processor portions (e.g., network interfaces) are used, what fraction of each resource is allocated (for example, a network interface can be shared by multiple processing pipeline stages), and the time period when the resources are to be allocated to the job.

Also, for each query, the scheduling optimization technique identifies which update tables (if any) are to be accessed to satisfy the query's data freshness constraint, what form these update, tables take (e.g., sorted versus unsorted update tables), and which resources are used for accessing the identified table(s).

Additional decisions to be made by the scheduling optimization problem relate to the characteristics of each job. A job's start time is a function of the job's precedence constraints (which are inputs), and the predecessor job end times (decision variables). A job's end time is a function of its start time, the amount of data to be processed and the chosen resources.

Based on the various decisions, the scheduling optimization technique can determine the achieved response time for each query, which allows the scheduling optimization technique to calculate the objective function's value.

Several constraints govern the formulation of the scheduling optimization problem according to some implementations, including some or all of the following:

1. Precedence relationships are determined between the jobs for a given data update (in the processing pipeline 102). The order of pipeline processing is: ingestion, ID remapping, sorting, and merging.
2. All data updates that arrive at time T are to be exposed to queries before any updates that arrive after time T. "Exposed" means that updates are made available for queries at the output of each pipeline stage (e.g., merged into the authority table, sorted SCUs exposed for query, or unsorted ID-remapped SCUs exposed for query). This constraint imposes a precedence constraint between data update batches (SCUs).
3. A query's freshness constraint determines which data updates are to be included in the query result.
4. The form of the data update consulted to satisfy the query depends on how far the data update has progressed through the processing pipeline at the time the query arrives. For example, if the desired data update has been sorted, but not yet merged into the authority table, the sorted update table will be consulted for this query.
5. Each job starts and ends only once.
6. Jobs start before they end.
7. A job holds resources after the job starts and before the job ends.
8. A job does not hold resources before the job starts or after the job ends.
9. Jobs end once their work is done. The work involved can include reading inputs and performing transformations (by processing pipeline stages) or query operations (for queries).
10. A job has to explicitly read its input data if the job is scheduled on a different set of processors than the job's predecessor jobs (for example, processors $P_1$ to $P_s$ for the sorting stage 108 have to read the outputs of processors $P_1$ to $P_r$ of the ID remapping stage 106 if set $P_1$ to $P_s$ and set $P_1$ to $P_r$ are distinct).
11. The amount of input data to be read depends on the degree of parallelism for a job (e.g., parallelism of a pipeline stage) and the job's predecessors, and how many processors the allocations have in common. If the jobs are co-located on the same processors, there is no communication overhead (between processors).
12. For simplicity, a job is assumed to be allocated a group of homogeneous processors, and the fraction of each processor allocated is the same across the group. As an extension, it may be useful to have a heterogeneous population of processors, and to permit different fractions of the processors to be allocated.
13. All work assigned to a given resource (e.g., processor, network interface) at a particular time is not to exceed the capabilities of the resource.
14. The time to perform work in a processing pipeline stage depends on the assigned degree of parallelism, the fraction of resources allocated to the job, and how fast the processors can perform the work at the assigned degree of parallelism (as determined by processing pipeline fitness tests, discussed below).
15. The achieved query response time is a function of the data to be consulted to satisfy the query (the authority tables and any update tables accessed to achieve the desired data freshness and the expected selectivity of the query), the assigned degree of parallelism, the fraction of resources allocated to the query, and how fast the processors can perform the work at the assigned degree of parallelism (as determined by the query performance fitness tests, discussed below).

Some of the constraints above refer to query performance fitness tests and processing pipeline fitness tests.

Query performance fitness tests evaluate query performance as a function of which authority tables are to be accessed, how many update tables are to be consulted, the selectivity of the query, and how many resources are used to satisfy the query. These fitness tests allow a determination of the response time for a query having a certain data freshness constraint, and given a particular, resource allocation, and allow the scheduling optimization technique to estimate how long processing by the query processing engine 630 will take, given a particular input data size and resource allocation.

Processing pipeline fitness tests include data transformation fitness tests and processing pipeline performance tests. Data transformation fitness tests estimate the output:input data size ratio for each processing pipeline stage. Processing pipeline performance fitness tests measure data processing rates for executing the different processing pipeline stages as a function of how many resources are used. For example, sorting fitness tests measure the rate of sorting possible for a given number of processors. Similarly, merging fitness tests measure the rate of merging possible for a given number of tables to be merged and a given number of processors. These processing pipeline fitness tests allow the scheduling optimization technique to estimate how long processing by a particular pipeline stage will take, given a particular input data size and resource allocation.

The above formulation of the scheduling optimization technique depends on knowledge of the update and query patterns and the periodic solution of an optimization problem to determine resource allocations and job schedules. A simple static alternative is to make a fixed allocation of resources for each processing pipeline stage, based on the relative speed of the pipeline stages. For example, one may determine an allocation of resources that provides the same data processing rate across all stages, based on the ingestion performance fitness tests described above.

Figure 7:
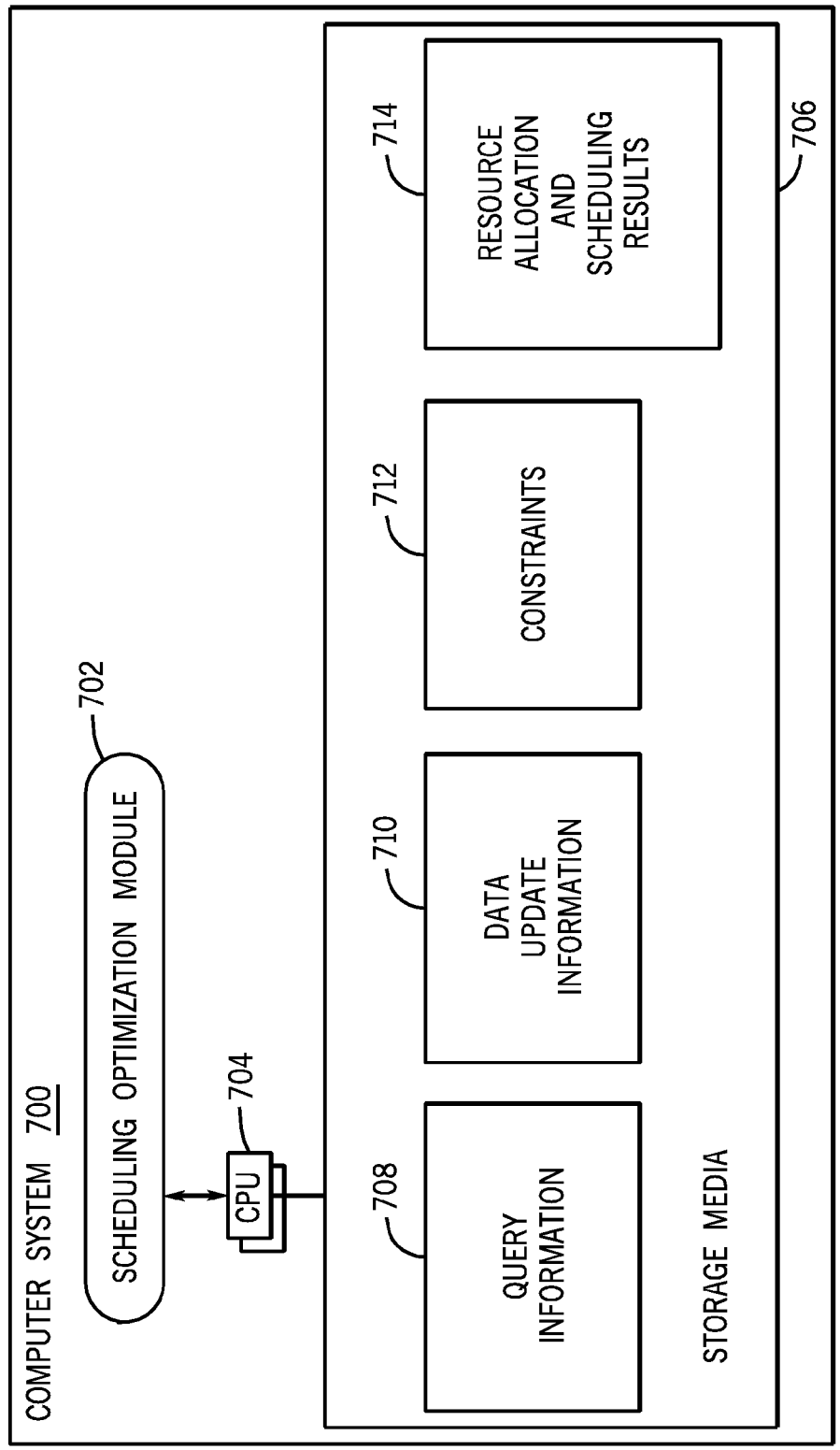
FIG. 7 is a block diagram of a computer system including a scheduling optimization module, according to some embodiments.

FIG. 7 shows an example computer 700 that includes a scheduling optimization module 702 according to some embodiments for performing the scheduling optimization technique as discussed above. The scheduling optimization module 702 is executable on one or plural CPUs 704. The scheduling optimization module 702 together with the one or plural CPUs 704 can form the resource allocation and scheduling mechanism 130 of FIG. 1. It is noted that the computer system 700 can be the server system 100 of FIG. 1, or can be distinct from the server system 100.

The one or plural CPUs 704 are connected to storage media 706. The storage media 706 contains query information 708

(representing the received at least one query to be processed by the server system 100), data update information 710 (representing data updates received by the server system 100), and constraints 712 to be satisfied by the scheduling optimization module 702 for performing resource allocation and scheduling. Alternatively, rather than storing the query information 708 in the storage media 706, the query information 708 can be received over a network, such as from client devices.

Based on the various inputs (query information 708, data update information 710, and constraints 712), the scheduling optimization module 702 produces a set of resource allocation and scheduling results 714, which are then used for allocating the resources of the server system for performing a set of jobs according to received quer(ies) and data update(s).

Instructions of the scheduling optimization module 702 are loaded for execution on a processor. Data and instructions are stored in respective storage devices, which are implemented as one or plural computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other storage devices. Note that the instructions of the software discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    receiving, by at least one processor, a query having at least one query constraint comprising a freshness constraint specifying how up-to-date data in a response to the query should be;
    identifying, by the at least one processor, a set of jobs to be scheduled in a system including a processing pipeline having plural processing stages that are to apply corresponding different processing to a data update to allow the data update to be stored, wherein the set of jobs is based on the data update and the query that requests access of data in the system, wherein the freshness constraint causes the set of lobs to access data of selected processing stages of the plural processing stages of the processing pipeline, the selected processing stages based on the freshness constraint; and
    scheduling, by the at least one processor, the set of jobs by assigning resources to perform the set of jobs, wherein assigning the resources is subject to at least one constraint associated with the data update and the at least one query constraint of the query, the resources assigned being based on the selected processing stages.

2. The method of claim 1, wherein assigning the resources comprises:
    assigning resources to at least one of the processing stages of the processing pipeline; and assigning resources to a query processing engine, wherein the query processing engine performs query processing in response to the query.

3. The method of claim 1,
    wherein assigning the resources to perform the set of jobs is based on the freshness constraint included in the query, the set of jobs comprising processing of the query using a portion of the assigned resources.

4. The method of claim 1, wherein the at least one constraint associated with the data update is selected from among an input data constraint relating to reading input data from one or more different computer nodes, a precedence constraint, an execution time constraint, and a resource constraint.

5. The method of claim 1, wherein assigning the resources comprises making decisions selected from the group consisting of:
    determining a degree of parallelism used for a given job;
    determining specific ones of the resources to allocate to the given job;
    determining a fraction of each of the resources to allocate to the given job;
    determining the given job's start time; and
    determining the given job's end time.

6. The method of claim 1, further comprising performing the data update in the processing pipeline that has a stage to transform the data update to allow content of the data update to be stored into a database.

7. The method of claim 6, wherein transforming the data update comprises at least one selected from among remapping identifiers of the data update, sorting the data update, and merging the data update.

8. The method of claim 1, wherein the system comprises the at least one processor, and wherein the identifying and the scheduling are performed by a resource allocation and scheduling mechanism in the system.

9. A computer system comprising:
    at least one central processing unit (CPU); and
    a scheduling module executable on the at least one CPU to:
    receive a query having at least one query constraint comprising a freshness constraint specifying how up-to-date data in a response to the query should be, wherein the query is for execution in a system having a processing pipeline including plural processing stages to process a data update, the plural processing stages selected from among: an ingest stage, an identifier remapping stage, a sorting stage, and a merging stage;
    identify a set of jobs to be scheduled based on the received query and the data update to be processed by the processing pipeline, wherein the freshness constraint causes the set of lobs to access data of selected processing stages of the plural processing stages of the processing pipeline, the selected processing stages based on the freshness constraint; and
    assign resources of the system having the processing pipeline to the set of jobs according to the at least one query constraint and at least one constraint associated with the data update, the resources assigned being based on the selected processing stages.

10. The method of claim 3, wherein the at least one query constraint of the query further comprises at least one selected from among a query performance goal, an input data constraint relating to reading input data from one or more different computer nodes, a precedence constraint, an execution time constraint, and a resource constraint.

11. The method of claim 3, wherein different levels of the freshness constraint included in the query cause the processing of the query to access different respective combinations of the plural processing stages.

12. The method of claim 3, wherein the query further includes a response time constraint specifying a target response time of the response to the query,
   wherein assigning the resources to perform the set of jobs is further based on the response time constraint.

13. The computer system of claim 9, wherein different levels of the freshness constraint included in the query cause the processing of the query to access different respective combinations of the plural processing stages.

14. The computer system of claim 9, wherein the query further includes a response time constraint specifying a target response time of the response to the query,
   wherein the assigning of the resources to the set of jobs is further based on the response time constraint.

15. An article comprising at least one non-transitory computer-readable storage medium storing instructions that upon execution cause a computer system to:
   receive a query having at least one query constraint comprising a freshness constraint specifying how up-to-date data in a response to the query should be;
   identify a set of jobs to be scheduled in a system that has a processing pipeline to process a data update received at the processing pipeline, wherein the processing pipeline has plural processing stages that apply corresponding different processing to the data update to allow the data update to be stored, wherein the set of jobs identified is based on the data update and the query, wherein the freshness constraint causes the set of lobs to access data of selected processing stages of the plural processing stages of the processing pipeline, the selected processing stages based on the freshness constraint; and
   allocate resources to perform the set of jobs that is based on a constraint associated with the data update and the at least one query constraint of the query, the resources assigned being based on the selected processing stages.

16. The article of claim 15, wherein the constraint associated with the data update comprises at least one selected from among an input data constraint relating to reading input data from one or more different computer nodes, a precedence constraint, an execution time constraint, and a resource constraint.

17. The article of claim 15, wherein allocating the resources comprises employing fitness tests that measure performance of different jobs, and wherein employing the fitness tests determines a level of parallelism to use for query processing and for each of the plural processing stages.

18. The article of claim 15, wherein different levels of the freshness constraint included in the query cause the processing of the query to access different respective combinations of the plural processing stages.

* * * * *